Figure 1:
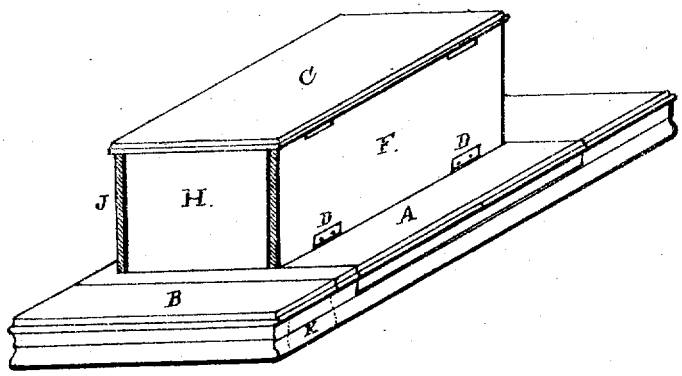

John J. Wheat's — Re-issue of

Improved Sewing Machine Table and Cover —

4527

REISSUED AUG 22 1871

Witnesses —
Edw. F. Brown.
R. M. Bruce.

John J. Wheat —
By his Atty —
S. F. Weigart —

AM. PHOTO-LITHOGRAPHIC CO. N.Y. (OSBORNE'S PROCESS.)

UNITED STATES PATENT OFFICE.

JOHN J. WHEAT, OF WHEELING, WEST VIRGINIA, ASSIGNOR OF ONE-EIGHTH INTEREST TO ABRAM LASH, OF BRIDGEPORT, OHIO.

IMPROVEMENT IN SEWING-MACHINE TABLES AND COVERS.

Specification forming part of Letters Patent No. 108,074, dated October 4, 1870; reissue No. 4,527, dated August 22, 1871.

*To all whom it may concern:*

Be it knowu that I, JOHN J. WHEAT, of Wheeling, in the county of Ohio and State of West Virginia, have invented certain Improvements in Sewing-Machine Tables and Cover, of which the following is a specification, reference being had to the annexed drawing and to the letters of reference marked thereon.

The object of my invention is to construct a sewing-machine table so that the box or cover thereof which covers that part of the machine which extends above the top of the table, although made fast to the table, can be so arranged and disposed of, when the machine is uncovered or the box removed from off it, as not to present an uneven and infirm surface for top of the table, which is the case with most tables in use when the box or cover is made fast to the table, and to do this in a firm, neat, and convenient manner. This I effect by making the top of the table in one solid piece, except that part thereof which is immediately behind the box and marked A in the drawing, and a portion of the right-hand end, which is cut to form a lid or cover for a till or box, K, in the frame of the table, which piece or lid is marked B in the drawing. The box or cover is made by attaching, with hinges, the ends and the front thereof to the top, so that when the top is thrown back from off the machine the ends and front will fold together on it, as shown by C C in Figures 3 and 4, respectively, of the drawing. This box is attached to that part of the top of the table marked A in the drawing, and also to the other part of said top of the table by three-leaf hinges, one leaf of which attaches to the part A, one to the main top of table, and one to the back side of the box, which last side of box is also attached, by hinges, to the top thereof, so as to admit of the top ends and front thereof being turned back and folded, as shown by C C, in Figs. 3 and 4, respectively. That separate part of the top of the table marked A is so made as to fall or sink down when the box or lid is turned back, the back side of the box F taking its place, and on a level with the top of the table. This part of top A rises and recedes as the box is raised or turned off, because of its manner of attachment by the three-leaf hinges before described, and because of its outside edge being sloped or inclined. This part A is also held in place by several button-shaped lugs on its under side, which lap over onto the bottom of the other part of table-top and the hinges and sloped edge before described.

Figure 2:
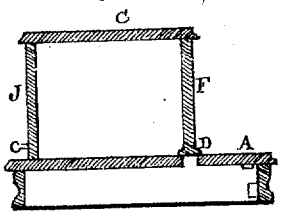
Figure 4:
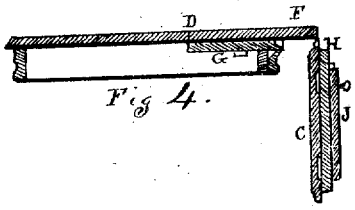
Figure 3:
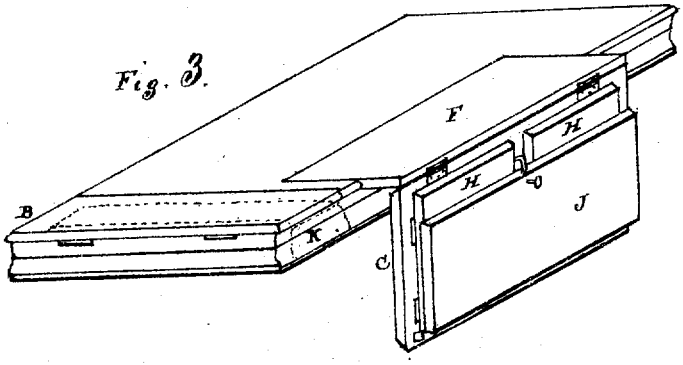

Figure 1 is a perspective view of the table with the box or cover on or over the machine. Fig. 2 is a sectional view of Fig. 1 cut through its center crosswise. Fig. 3 is a like view of the same with the box thrown off the machine and folded up. Fig. 4 is a like view of Fig. 3, in which—

A represents that portion of the top of the table which has no connection with it, save by the three-leaf hinges D connecting it with the table through the back side of the box marked F. B shows the lid of the till K in the frame of the table; C, the box thrown off behind and folded up; thus the back side of it, marked F, enters or falls into the place before filled by that part of the table marked A, and the top hangs down behind the frame of table, on which the ends are first closed in on it, and then the front side closes upon them, and made fast to the top by a key or any like thing; or, instead of this manner of folding, the front side may be closed up first and then the ends on it; and the top piece C, ends H, and front J fold together when thrown off and back of the machine or table. G shows the position of that part of table-top A when the box is thrown off the machine.

What I claim as my invention, and desire to secure by Letters Patent, is—

1. That part of the table marked A, in combinotion with the back side of the box or cover marked F, and operated as herein described.

2. The sewing-machine table, composed of the top with sinking part A and the box C, all arranged to fold up and throw back, as shown in Fig. 3, and constructed substantially as herein described.

JOHN J. WHEAT.

Witnesses:

J. FRANKLIN REIGART,

EDM. F. BROWN.